United States Patent
Fujisawa et al.

(10) Patent No.: US 7,460,655 B2
(45) Date of Patent: Dec. 2, 2008

(54) PICTURE PHONE MONITOR SYSTEM

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 868 days.

(21) Appl. No.: 10/514,541

(22) PCT Filed: May 27, 2003

(86) PCT No.: PCT/JP03/06627

§ 371 (c)(1),
(2), (4) Date: Nov. 12, 2004

(87) PCT Pub. No.: WO03/101108

PCT Pub. Date: Dec. 4, 2003

(65) Prior Publication Data

US 2005/0179773 A1  Aug. 18, 2005

(30) Foreign Application Priority Data

May 28, 2002  (JP) .............................. 2002-154786

(51) Int. Cl.
*H04M 11/00* (2006.01)
(52) U.S. Cl. ........................ 379/106.01; 379/102.01; 348/14.02
(58) Field of Classification Search ............ 379/106.01, 379/102.01, 37–45; 348/14.02, 14.05, 14.01
See application file for complete search history.

(56) References Cited

U.S. PATENT DOCUMENTS

| | | | | |
|---|---|---|---|---|
| 6,064,421 A | * | 5/2000 | Pohl | 379/102.01 |
| 6,278,884 B1 | * | 8/2001 | Kim | 379/102.02 |
| 6,567,502 B2 | * | 5/2003 | Zellner et al. | 379/45 |
| 6,633,231 B1 | * | 10/2003 | Okamoto et al. | 348/14.01 |
| 6,704,040 B2 | * | 3/2004 | Sato | 348/14.02 |
| 6,833,788 B1 | * | 12/2004 | Smith et al. | 379/40 |
| 6,956,599 B2 | * | 10/2005 | Lim et al. | 348/14.02 |
| 2003/0104800 A1 | * | 6/2003 | Zak | 455/404 |

OTHER PUBLICATIONS

Patent Abstract of Japan; Publication No. 2002-084531; Publication Date: Mar. 22, 2002; Applicant: Nippon Telegr & Teleph Corp [NTT].

Patent Abstract of Japan; Publication No. 2002-057808; Publication Date: Feb. 22, 2002; Applicant: NEC Corp.

Patent Abstract of Japan; Publication No. 09-121262; Publication Date: May 6, 1997; Applicant: Hinotsukusu KK.

(Continued)

*Primary Examiner*—Stella L Woo
(74) *Attorney, Agent, or Firm*—Manabu Kanesaka

(57) ABSTRACT

Picture telephone monitoring system in which a picture telephone (14) in a monitoring side and another picture telephone (18) in an operating side are connected to each other, and the picture telephone (14) is connected to an operation console (16). The operation console includes an infrared sensor (17) for detecting an intruder, a displacing device for moving a view field of a camera combined with the picture telephone (14), a sound pickup microphone, a speaker for outputting audio signals transmitted from the picture telephone (18) and received by the picture telephone (14) via an earphone terminal thereof, and a preset value accumulating section for recording therein a telephone number of and an in-coming dial tone from the picture telephone (18).

8 Claims, 6 Drawing Sheets

OTHER PUBLICATIONS

Patent Abstract of Japan; Publication No. 2001-024991; Publication Date: Jan. 26, 2001; Applicant: Morisato Masakazu.
Patent Abstract of Japan; Publication No. 2001-069268; Publication Date: Mar. 16, 2001; Applicant: Horiba Ltd.
Patent Abstract of Japan; Publication No. 2002-051156; Publication Date Feb. 15, 2002; Applicant: Takaoka Sadao.
Patent Abstract of Japan; Publication No. 2001-057600; Publication Date: Feb. 27, 2001; Applicant: Horiba Ltd.
Patent Abstract of Japan; Publication No. 2002-149706; Publication Date: May 24, 2002; Applicant: Matsushita Electric Works Ltd.
Patent Abstract of Japan; Publication No. 2001-067577; Publication Date: Mar. 16, 2001; Applicant: Horiba Ltd.

* cited by examiner

PICTURE PHONE MONITOR SYSTEM

FIELD OF THE INVENTION

The present invention relates to a monitoring system making use of a picture telephone, and more specifically to a system for monitoring intruders into an empty home by utilizing a plurality of units of portable type picture telephone.

BACKGROUND TECHNOLOGY

There has been known a monitoring system making use of a picture telephone or the like. For instance, Japanese Patent Laid-Open Publication No. 2002-84531 discloses a remote-controlled mobile monitoring robot system as a system for remotely monitoring situations inside an empty office or an empty home without requiring installation of a number of monitoring cameras and with only one unit of mobile robot camera from a center, and in this system, a communication terminal unit for a picture telephone or the like and a remote control unit are provided at the center; a communication terminal unit for a picture telephone or the like connected to the communication terminal unit at the center via a public communication network, an AV tuner, a transmitter, and a mobile robot camera are provided at a user's home; and AV information with the mobile robot camera is monitored with the communication terminal unit at the center via the AV tuner, communication terminal, and public communication network by remotely controlling the mobile robot camera at the user's home with the remote control unit at the center via the communication terminal unit, public communication network, communication terminal unit, and transmitter.

In this system, in addition to many facilities for controlling a camera/microphone section (mobile robot camera), many other facilities are required for both the controlling side and controlled side, and a vast amount of capital investment is required.

Further in association with the progress in the field of a mobile telephone, for instance, Japanese Patent Laid-Open Publication No. 2002-57808 discloses a mobile telephone having the function of a picture telephone capable of real time image transfer based on the communication system of the next generation with the high transfer capability such as W-CDMA, which can also be used as a remote monitor or a simple monitor for remote medical services. With the mobile telephone, the side sending a request for controlling a camera to a connected site transfers a control command generated in the control section by performing various key operations to a radio transmitting/receiving section and transmits the control command as a radio signal from an antenna. The side with the camera remotely controlled analyzes the control command received via the antenna and the radio transmitting/receiving section with the control section, and carries out an operation corresponding to the received control command. Japanese Patent Laid-Open Publication No. 2002-57808 also describes that an external I/O section controls over operations of a camera according to control data transmitted from the control section.

In the invention described in Japanese Patent Laid-Open Publication No. 2002-57808, specific control signals are transmitted to a receiving side for controlling various types of functions in the controlled side, so that products in both the controlling side and controlled side are required to have the communicating function for remote monitoring, and therefore there is the disadvantage that the versatility is not ensured. Further in the invention described in the Publication, the controlled side demands authentication with a password or the like to allow or inhibit control, but in the case of authentication with a password or the like, hacking is possible, which disadvantageously lowers the reliability of the system.

DISCLOSURE OF THE INVENTION

In the current situation where security in daily life is being lost day by day and the self-responsibility is strongly required, the present invention provides a monitoring system built with economical and simple devices, and it is an object of the present invention to provide, as a solution for the problem described above, a monitoring system which can easily be operated and installed.

The present invention provides a picture telephone monitoring system in which a picture telephone in a monitoring side and that in an operating side are connected to each other, and the picture telephone in the monitoring side is connected to an operation console comprising a sensor for detecting an intruder, a displacing means for moving a view field of a camera combined with the picture telephone in the monitoring side, a sound pickup microphone, a speaker for outputting audio signals transmitted from the picture telephone in the operating side and received by the picture telephone in the monitoring side via an earphone terminal thereof, and a preset value accumulating section for recording therein a telephone number of and an in-coming dial tone from the picture telephone in the operating side.

The operation console further preferably comprises a light for supplementing brightness for the camera.

The operation console preferably comprises a voice recognizing section for recognizing the audio signal transmitted from the picture telephone in the operating side and received by the picture telephone in the monitoring side with the earphone terminal thereof as an operation signal for the displacing means or for the light for supplementing brightness for the camera.

The picture telephone in the operating side is preferably a mobile telephone having the function as a picture telephone.

The sensor is preferably an IR sensor.

The light and/or the speaker is preferably installed with a space from the operation console.

The operation console preferably has a form like that of a doll, a stuffed, or a figurine.

The operation console preferably has a sound microphone for sensing an in-coming dial tone from the picture telephone in the operating side and a voice recognizing section for recognizing the in-coming dial tone.

Further the operation console preferably has a recharging circuit for recharging a built-in battery of the picture telephone in the monitoring side and a switch for switching ON or OFF the recharging circuit.

BEST MODE FOR CARRYING OUT THE INVENTION

A preferred embodiment of a picture telephone monitoring system according to the present invention is described with reference to the related drawings.

Figure 1:
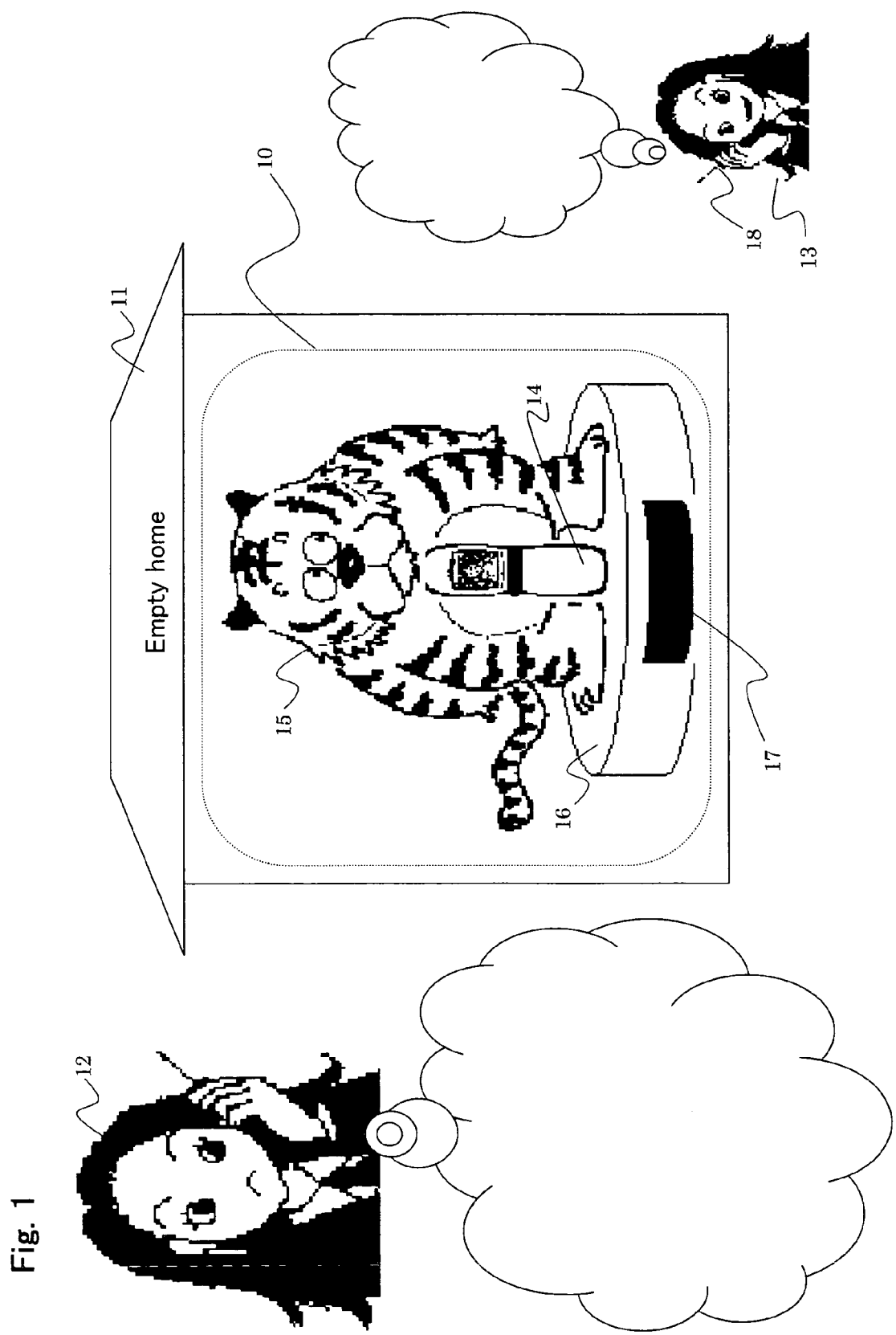
FIG. 1 is a conceptual diagram for illustrating a case in which a monitoring system according to the present invention is applied to an empty home.

FIG. 1 is a conceptual diagram for illustrating a case in which the monitoring system is applied to an empty home, and this figure shows the configuration in which a monitor 10 embodying the monitoring system is installed at an empty home 11 with a user 12 imaging needs for uses and a user 13 after installation of the monitoring system shown in both sides thereof. In the figure, the user 12 is considering, for instance, "I feel someone sneaked into my room, but nothing was stolen. There is no evidence, so it's difficult to report this to an police office, but hiring a security company is hard . . .".

The monitor 10 comprises an animal-formed figurine (a stuffed looking like a tiger) 15 having a built-in mobile telephone having the picture telephone function 14, and an operation console 16 for rotating the animal-formed figurine 15 to change a view field of a camera (not shown) incorporated in the mobile telephone 14. The operation console 16 has an IR sensor 17 for sensing an intruder.

In FIG. 1, the user 13 after installation of the monitoring system has a mobile telephone 18 with the picture telephone function in the side remotely controlling this monitoring system, and the user 13 is considering with ease, for instance, "With this, if any abnormal state occurs in my room, the situation is reported by the picture telephone. I can always connect to the picture telephone to monitor the situation in side my room, so now I have no problem."

In this monitoring system, the mobile telephones 14, 18 each with the picture telephone function may be picture telephones each having the mobile telephone function, and the animal-formed figurine 15 is used to camouflage the mobile telephone 14, and there is no specific restriction over the form, so that any form such as an animal or a doll is allowable. According to a purpose of monitoring or an application, any of sensor switches such as a temperature sensor, a humidity sensor, a voice sensor, a range sensor or the like may be used as or together with the IR sensor 17.

The monitor 10 is installed at a place within a sensible range by the IR sensor 17 such as a place where, for instance, a bank note is stored and the possibility of intrusion by an intruder is most high, and a target for reporting by the monitor 10 is previously set. When an intruder comes in the range sensible by the IR sensor 17, the monitor 10 is automatically connected to the mobile phone 18 with the picture telephone function carried by the user 13, and sends the image and voices. When the user 13 having received the report can not identify the intruder because of a position of the camera, the user 13 changes a view field of the camera by rotating the operation console 16 in the vertical or horizontal direction according to the remote control method described later. Further when brightness for the camera is insufficient, for instance, during night time, the user 13 can also light up the supplementary light or output voices from the monitor 10 by using the communicating function in this system. In order to prevent the monitor 10 from being discovered by an intruder, it is preferable that the light or speaker is installed as a separate device controllable by the monitor 10 by means of the radio or wired communication with a space from the monitor 10. Further, if the capability of the mobile telephone 14 with the picture telephone function allows photographing and transmission of a still picture or the like, it is preferable that the mobile telephone 14 is used with the monitor 10.

Figure 2:
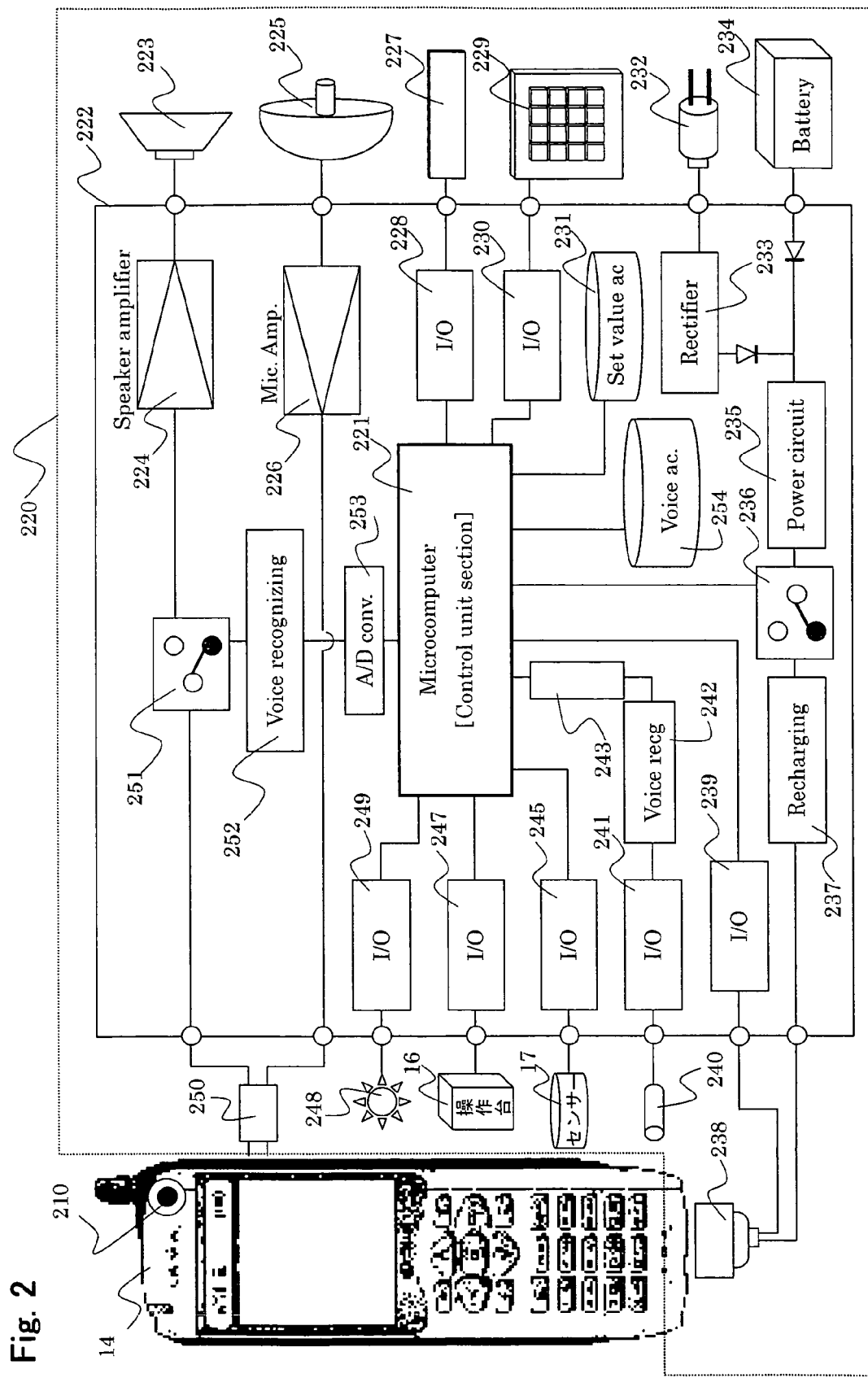
FIG. 2 is a block diagram showing a monitor 10 and a group of controlled devices and equipment.

FIG. 2 is a view showing the mobile telephone 14 with the picture telephone function having a camera 210 for a picture telephone, the mobile telephone 14 provided at a center of a block diagram for controlling the mobile telephone 14 with the picture telephone function incorporated in the animal-formed figurine for the monitor 10 or in the operation console 16. The block diagram 220 is divided to a block diagram 222 illustrating a control circuit including a microcomputer (control unit section) 221 incorporating a program dedicated to control of the monitor 10 and a portion showing a group of controlled device and equipment.

The block diagram 222 shows the configuration with the microcomputer (control unit section) 221 provided at the center, in which there are provided, from the right upper section of the figure, a speaker amplifier 224 connected to a speaker 223 for outputting actual voices of the user 13 or voices previously registered in a voice accumulating section 254 described hereinafter; a microphone amplifier 226 for picking up sounds in a room with a sound pickup microphone 225 and transmitting the sounds; a liquid crystal screen 227 required for setting a target for transmission or other items and an I/O section 228 thereof; a keyboard 229 required for setting a target for transmission or other items and an I/O section 230 thereof; a set value accumulating section 231 for accumulating and storing therein set values set in association with various types of operations for setting; a power supply plug 232 for supplying utility power to all of the devices and equipment and a rectifier circuit 233 for converting an alternating current to a direct current; back-up battery 234 in preparation for an emergency such as power failure; a power circuit 235 for adjusting a voltage required for a connection circuit or for the devices and equipment; a switch 236 for executing ON/OFF of a recharging circuit under control by the microcomputer (control unit section) 221; a recharging circuit 237 for recharging a battery incorporated in the mobile telephone 14 with the picture telephone function; a connection adaptor 238 for connecting an external connection terminal portion of the mobile telephone 14 with the picture telephone function to the monitor 10 and an I/O section 239 thereof; a microphone 240 for sensing an in-coming dial tone to the mobile telephone 14 with the picture telephone function and an I/O section 241 thereof; a voice recognizing section 242 for identifying an in-coming dial tone therefrom and an A/D converter 243 for executing signal conversion for a digital circuit; an IR sensor 17 for sensing an intruder and an I/O section 245 thereof; an operation console 16 for rotating the animal-formed figurine 15 in the vertical or horizontal direction and an I/O section 247 thereof; a light 248 for supplementing brightness for a camera and an I/O section 249 thereof; a plug 250 for connecting an earphone terminal of a microphone of the mobile telephone 14 with the picture telephone function to the monitor 10; a switching unit 251 for switching a connection target under control by the microcomputer 221; a voice recognizing section 252 for identifying voices from an earphone terminal of the mobile telephone 14 with the picture telephone function and an AD converter 253 for executing signal conversion for a digital circuit; and a voice accumulating section 254 for accumulating therein voices when outputting voices to the speaker 223 under control by the microcomputer 221 or those when sending a voice message to a mobile telephone which is a target for reporting.

Figure 3:
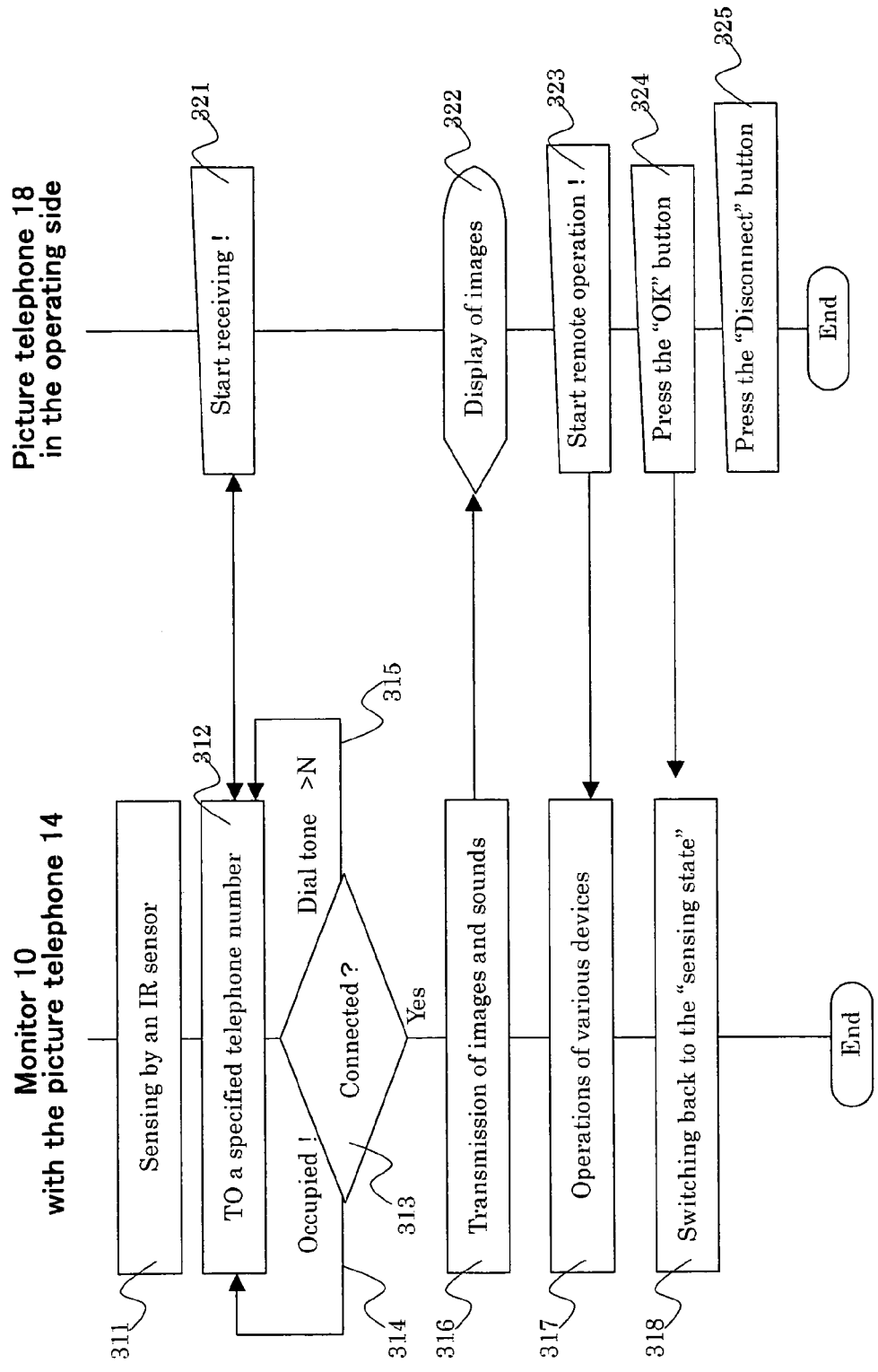
FIG. 3 is a flow chart showing a procedure in a process for reporting to a mobile telephone as a target for reporting.

Next, actions of the picture telephone monitoring system according to the present invention are described below with reference to flow charts shown in FIG. 3 to FIG. 5 and also to the block diagram shown in FIG. 2. At first, the processing procedure for reporting to the mobile telephone 18 with the picture telephone function as a target for reporting is described with reference to the flow chart in FIG. 3 showing various operations performed between the monitor 10 with the mobile telephone 14 in the monitoring side connected thereto and the picture telephone 18 in the operating side receiving the report in the concurrent state.

In the monitor 10, when intrusion of an intruder is sensed by the IR sensor 17 (311), the situation is reported from the I/O section 245 thereof to the microcomputer (control unit section) 221. The microcomputer 221 having received this report reads out a preset telephone number from the preset value accumulating section 231 and set a call to the picture telephone via the connection adaptor 238 and the I/O section 239 thereof (312). The microcomputer 221 determines whether connection to the picture telephone 18 in the operating side has been established or not (313), and when the picture telephone 18 is occupied or connection is not established after the dial tone is generated prespecified times N, the microcomputer 221 again sets a call to the picture telephone 18 (314, 315).

The picture telephone 18 in the operating side having received a call is connected to the caller when the connection button is pressed (321). When it is recognized that the connection has been established, the picture telephone 14 in the monitoring side starts transmission of images and sounds with the picture telephone function (316), while the picture telephone 18 in the operating side receives and displays the images and sounds (322).

When the user 13 recognizes the images on the picture telephone 18 in the operating side, the user 13 can make the various devices in the monitor 10 operate (317) by carrying out the operating method described below (323). For instance, to change a view field of the camera 210 to a desired direction, an operation signal from the picture telephone 18 in the operating side is received by the picture telephone 14 in the monitoring side as an audio signal and is sent via the plug 250 to the voice recognizing section 252 for recognizing voices and sounds, then is converted to a digital signal by the A/D converter 253 executing signal conversion for a digital circuit, and is delivered to the microcomputer 221. The microcomputer 221 having received this signal issues an instruction according to contents of the signal to the I/O section 247 operating the operation console 16, and the I/O section 247 having received the instruction makes the operation console 16 operate. Similarly, also the light 248 for supplementing the brightness for a camera and the I/O section 249 thereof are controlled according to an operation signal from the picture telephone 18 in the operating side.

When the user 13 wants to give warning to the intruder with actual voices from a remote site, the audio signal is transmitted when the operations described below are carried out, and the microcomputer 221 having received the signal gives an instruction to the switching unit 251 for executing switching a connection target to temporally establish connection to the speaker amplifier 224 for outputting actual voices, and the speaker 223 outputs voices of the operator. The expression of "temporally" used herein indicates a period of time preferably decided by the timer control system.

The roles of the sound pickup microphone 225 and the I/O section 226 shown in FIG. 2 are to transmit all of voices and sounds picked up at the site where the monitor 10 is installed to the picture telephone 18 in the operating side while the two picture telephones 14, 18 are connected to each other.

To finish the operations as described above and return the monitoring system from the reporting state to the ordinary sensing state, the user 13 sends an OK signal from the picture telephone 18 in the operating side by carrying out the operation described below (324), when the microcomputer 221 returns the operating mode of the monitor 10 to the "sensing state" like in the case of operations of the various devices described above (318). Then the user 13 terminates the operation by pressing a disconnection button on the picture telephone 18 in the operating side (325).

When the operations in the reporting processing as shown in FIG. 3 are carried out, the IR sensor 17 and the microphone 240 for sensing an in-coming call are set OFF by the microcomputer (control unit section) 221.

Next, the method of setting a telephone number of a target for reporting in the picture telephone monitoring system according to the present invention is described with reference to FIG. 4. FIG. 4 is a flow chart illustrating, in the parallel state, operations of the monitor 10 to which the picture telephone 14 in the monitoring side is connected as well as operations of the picture telephone 18 in the operating side which receives a report from the picture telephone 14 in the monitoring side, and the picture telephone 14 in the monitoring side and the picture telephone 18 in the operating side, the liquid crystal screen 227, and the keyboard 229 each described in relation to FIG. 2 are shown in the left side of the figure so that the concept can be understood better.

When setting a telephone number, the user 13 at first presses the "Telephone" button on the keyboard 229 of the monitor 10 (421). Then a call is sent from the picture telephone 18 in the operating side which is to be set as a target for calling to the picture telephone 14 in the monitoring side (411). An in-coming call dial tone is generated on the picture telephone 14 in the monitoring side (422) with a telephone number of the calling side displayed on the screen, and at the same time the same telephone number is displayed also on the liquid crystal screen 227 of the monitor 10 (423). To describe this operation flow with reference to FIG. 2, when a user presses the key "Telephone" on the keyboard 229, the signal is transmitted via the I/O section 230 to the microcomputer 221. The microcomputer 221 having received this signal becomes ready for receiving an in-coming telephone number signal from the connection adaptor 238 and the I/O section 239 thereof, and when the microcomputer 221 receives the signal, the microcomputer 221 immediately has the signal displayed on the liquid crystal screen 227.

Figure 4:
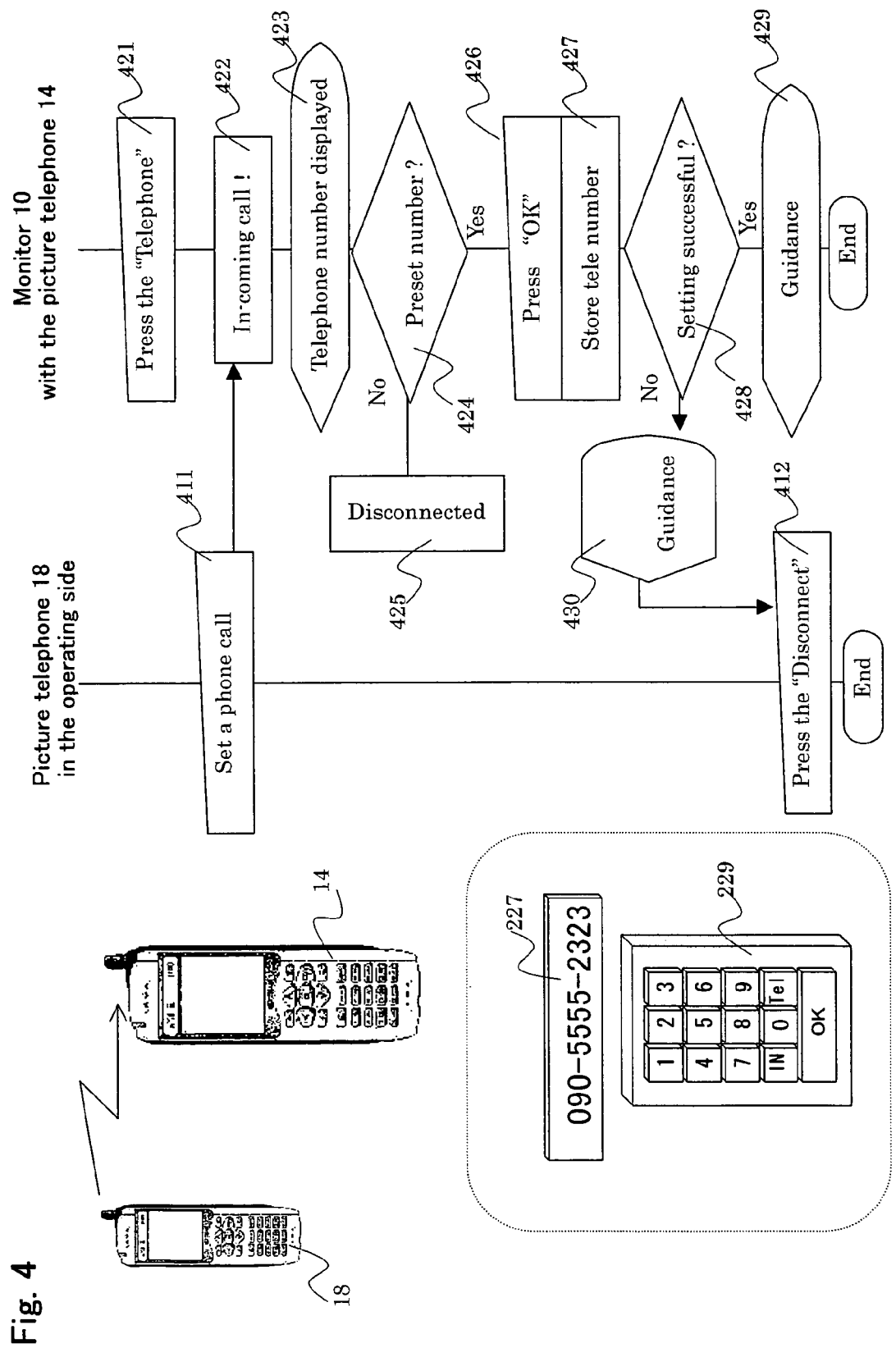
FIG. 4 is a flow chart showing a process for setting a telephone number for a reported picture telephone in the picture telephone monitoring system.

Again in FIG. 4, when the user 13 recognized that the displayed telephone number is that of the picture telephone 18 in the operating side which is to be set as a target for connection (424), the user 13 presses the "OK" button on the keyboard 229 (426) to store the telephone number. The microcomputer 221 having received the signal stores this telephone number in the set value accumulating section 231 (427), and when the telephone number is recorded normally, the display of "Setting completed" is given on the liquid crystal screen 227 (429), and when the telephone number is not stored in the normal state, the display of "Setting failed" is given on the liquid crystal screen 227 (430), and the processing is terminated. When the display of "Setting failed" is given on the screen (430), the user 13 repeats the procedure for setting again. When the display described above is given, the user 13 may terminate the processing also by pressing the disconnection button on the picture telephone 18 in the operating side (412). Further the operation for "setting a telephone number" may be carried out by directly inputting the telephone number from the keyboard 229.

A method of setting any picture telephone 18 in the operating side as a target to be operated by specifying itself from the picture telephone 18 in the operating side as contrary to the procedure in the method described above is described with reference to the flow diagram shown in FIG. 5. In this setting method, the "function for generating a different in-coming dial tone for each telephone number" generally available in a mobile telephone or the like is used as a password.

In this method, at first, the user 13 presses the "In-coming dial tone" button on the keyboard 229 of the monitor 10 (521) to set the monitor 10 in the in-coming dial tone storing mode. Then the guidance of "In-coming dial tone being stored" is displayed on the liquid crystal screen 227 of the monitor 10 (523). Then the picture telephone 18 in the operating side sets a call to the picture telephone 14 in the monitoring side (511). Then an in-coming dial tone is generated in the picture telephone 14 in the monitoring side (522), and a telephone number of a caller is displayed on the screen of the picture telephone 14 in the monitoring side. To described this operation flow with reference to FIG. 2, when the key "In-coming call" on the keyboard 229 is pressed, the signal is delivered via the I/O section 230 to the microcomputer 221. The microcomputer 221 having received this signal is set in the state where the microphone 221 can receive an in-coming call dial tone from the microphone 240 sensing the in-coming call and the I/O section 241 thereof.

Figure 5:
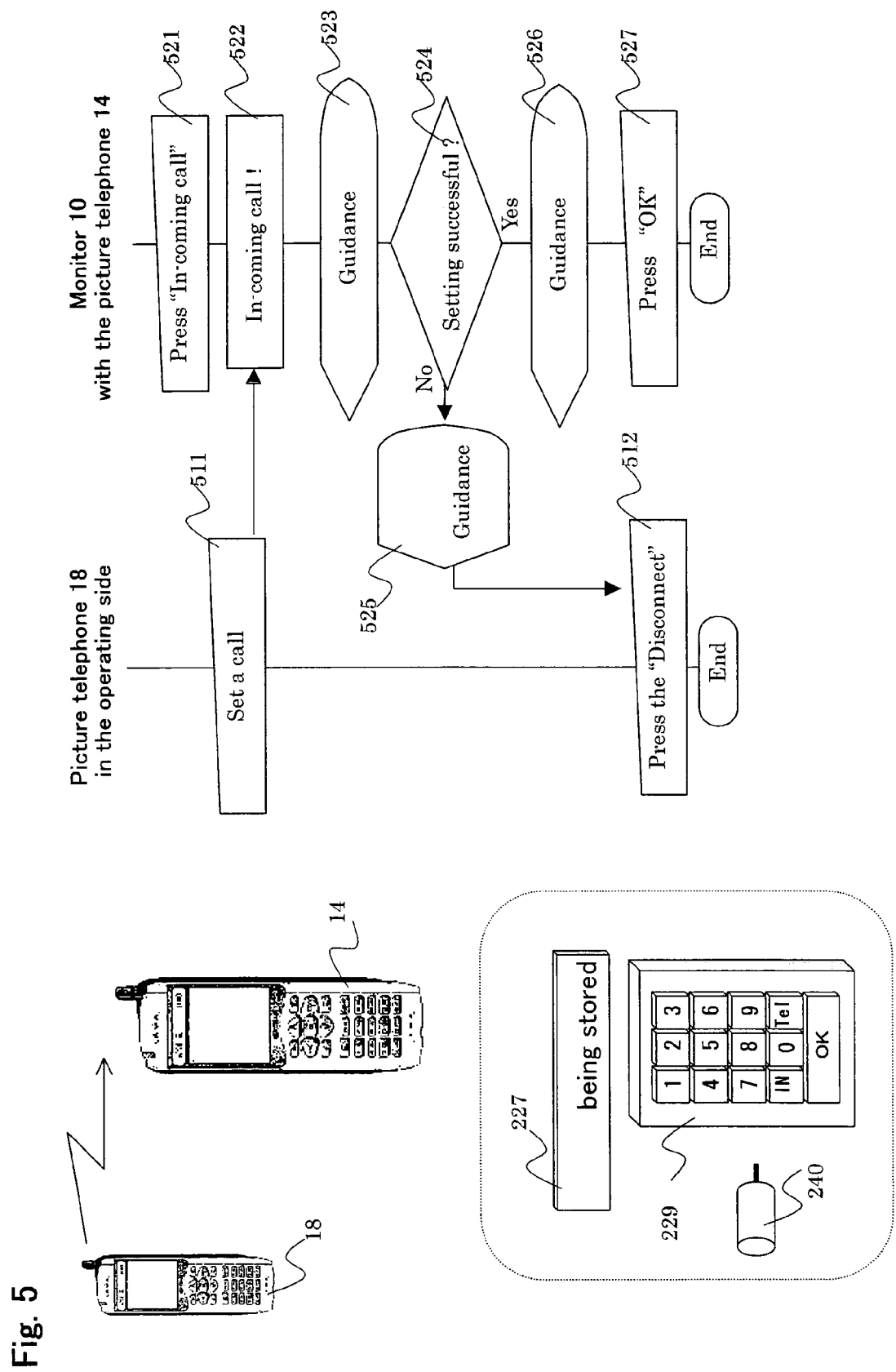
FIG. 5 is a flow chart showing a process for setting a target for reporting with an individual in-coming dial tone function.

Again in FIG. 5, the microphone 221 having received the in-coming call dial tone records the in-coming call dial tone in the set value accumulating section 231 (524), and when the in-coming call dial tone is recorded in the normal state, the display of "Setting completed" is given (526), and when the in-coming call dial tone is not recorded in the normal state, the display of "Setting failed" is given on the liquid crystal screen 227 respectively (525). Then, when the user 13 presses the "OK" button to acknowledge the result (527), the microcomputer 221 terminates the processing. When the display of "Setting failed" is given (525), the user 13 repeats the procedure again. After the display above is given, an operator of the picture telephone 18 in the operating side may terminate the processing by pressing the disconnection button (512). With the setting operation as described above, the picture telephone 18 in the operating side and the picture telephone 14 in the monitoring side can call each other, and operation of the monitor 10 can be started regardless of which of the two picture telephones set a call to the other.

Figure 6:
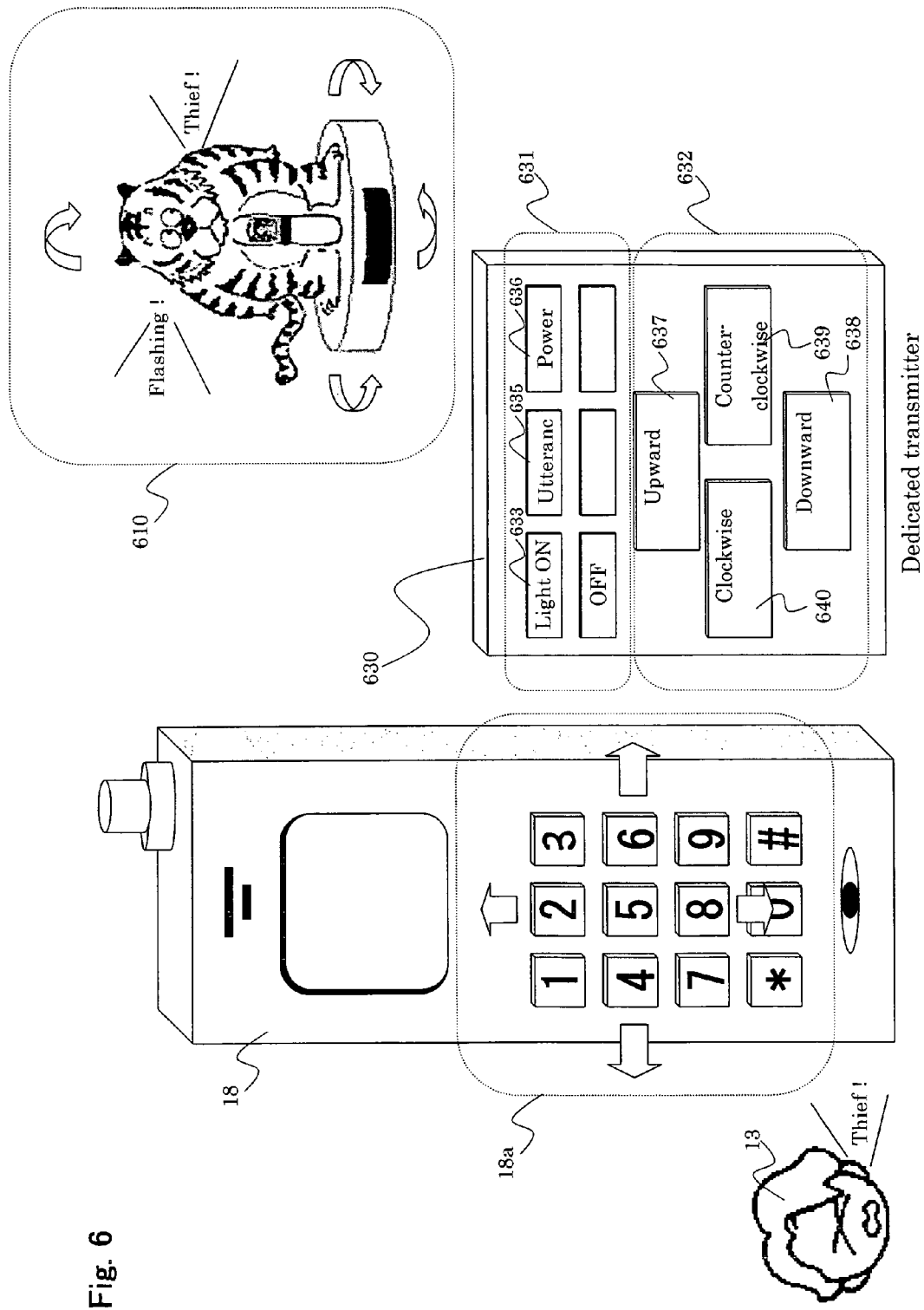
FIG. 6 is an explanatory view illustrating a method of inputting a control signal from the picture telephone in the operating side.

Next a method of inputting a control signal to start operations of the monitor 10 from the picture telephone 18 in the operating side is described with reference to FIG. 6. FIG. 6 shows an image 610 illustrating a state in which the monitor 10 is being controlled from a remote site, and a method of inputting each of the three types of control signals, namely (1) input from a dial key 18a of the picture telephone 18 in the operating side, (2) use of a dedicated transmitter 630, and (3) pronounce of voices by the user 13 himself or herself.

In any of the input methods described above, the picture telephone 14 in the monitoring side receives a control signal as "voices", but in the case (3) above in which a control signal is inputted as actual voices of the user himself or herself, voice tone of the user 13 pronounced in an emergency may change from that in the normal state, which may disable normal operations of the monitoring system, so that the reliability is rather low. Also in the case (1) in which key entry from the dial keys 18a is employed, a control signal is inputted by the use of a combination of signs not relating to figures or characters displayed as the dial keys 18a, so that sometimes incorrect operations may be done in an emergency. However, any method may have advantages and disadvantages, and therefore if proper countermeasure is taken when utilized for a business purpose, each of the methods described above would be effective in actual use.

Herein description is made especially in relation to the method of inputting a control signal by the use of a dedicated transmitter 630 as described in case (2) above.

A group of operation buttons is prepared on a front panel of the dedicated transmitter 630, and a speaker port not shown for generating an audio signal is provided on a rear panel thereof. The group of operation buttons is largely divided to a group of buttons 631 to which control methods for the various devices described above are assigned and a group of buttons 632 for controlling the operation console 16, and the group of button 631 comprises buttons 633, 633 for turning ON/OFF the light 248 for supplementing the brightness for the camera installed in the side of the monitor 10, a pronounce button 634 for outputting warning voices previously registered in the voice accumulating section 254, a switch button 635 for outputting a user's actual voices from the speaker 223, a button 636 for turning ON/OFF the recharging circuit 237 for a picture telephone, and other spare buttons. An ON button and an OFF button may be provided as the switching buttons 635 for the speaker 223, but to simplify configuration of the control circuit as shown in the block diagram 222, the timer system, in which, for instance, the operations are ON for three seconds after the switch button 635 is pressed, and then are turned OFF automatically, is preferable.

With the recent recharging system for a mobile telephone, recharging is carried out only once for one request for recharging, and even when the residual capacity of the battery drops, recharging is not carried out automatically twice or thrice so long as a request for recharging is not issued again, and the button 636 for turning ON or OFF the recharging circuit 237 for a picture telephone is employed in the present invention to solve this problem. The recharging system as described above is employed for prolonging a life of a battery for a mobile telephone by suppressing rather excessive times of recharging, but when recharging is carried out while the mobile telephone 14 with the picture telephone function and the connection adaptor 238 are kept connected for a long time, sometimes the efficient recharging effect may not be achieved. This recharging system for a mobile telephone as described above is not suited and rather inconvenient for the picture telephone monitoring system for an empty home or the like according to the present invention, and therefore ON/OFF operations of the button 636 are carried out so that the picture telephone 14 in the monitoring side is recharged without fail, and also to prevent the residual capacity of the battery from dropping to zero.

The group of buttons 632 for the operation console 16 comprises, for instance, buttons (637 to 640) dedicated to rotations in the upward, downward, leftward, and rightward directions respectively. The group of control buttons 632 for the operation console 16 may be based on the free rotation system like a joy stick, but when taking into consideration the mobility and portability, the button system is more practical as compared to the joy-stick type of system having a cubic structure, and the dedicated transmitter 630 should preferably be downsized as much as possible, and is preferably attached, for instance, as an accessory to a tip of a strap for a mobile telephone.

As for the program stored in the microcomputer (control unit section) 221, it is preferable that a new version of the program can be downloaded by the use of the keyboard 229, liquid crystal screen 227, and mobile telephone 14 with the picture telephone function.

As described in detail above, with the picture telephone monitoring system according to the present invention, every one can easily and economically build up a monitoring system by using a mobile telephone with the picture telephone function introduced into the market recently.

The invention claimed is:

1. A picture telephone monitoring system with a picture telephone in a monitoring side and a picture telephone in an operating side connected to each other, wherein the picture telephone in the monitoring side is connected to an operation console comprising a sensor for sensing an intruder, a displacing means for changing a view field of a camera associated with the picture telephone in the monitoring side, a sound pickup microphone, a speaker for outputting an audio signal transmitted from the picture telephone in the operating side and received by the picture telephone in the monitoring side via an earphone terminal thereof, and a set value accumulating section for recording therein a telephone number of or an in-coming dial tone from the picture telephone in the operating side, and wherein the operation console further comprises a voice and sound recognizing section for recogizing the audio signal transmitted from the picture telephone in the operating side and received by the picture telephone in the monitoring side via the earphone terminal thereof as an operation signal for the displacing means or a light for supplementing brightness for the camera.

2. The picture telephone monitoring system according to claim 1, wherein the operation console further comprises the light for supplementing brightness for the camera.

3. The picture telephone monitoring system according to claim 1, wherein the picture telephone in the operating side is a mobile telephone with a picture telephone function.

4. The picture telephone monitoring system according to claim 1, wherein the sensor is an infrared sensor.

5. The picture telephone monitoring system according to claim 1, wherein the light and/or the speaker are installed with a space from the operation console.

6. The picture telephone monitoring system according to claim 1, wherein the operation console has a form of a doll, or a figurine.

7. The picture telephone monitoring system according to claim 1, wherein the operation console further comprises a recharging circuit for recharging a battery built in the picture telephone in the monitoring side and a switch for turning ON/OFF the recharging circuit.

8. The picture telephone monitoring system with a picture telephone in a monitoring side and a picture telephone in an operating side connected to each other, wherein the picture telephone in the monitoring side is connected to an operation console comprising a sensor for sensing an intruder, a displacing means for changing a view field of a camera associated with the picture telephone in the monitoring side, a sound pickup microphone, a speaker for outputting an audio signal transmitted from the picture telephone in the operating side and received by the picture telephone in the monitoring side via an earphone terminal thereof, and a set value accumulating section for recording therein a telephone number of or an in-coming dial tone from the picture telephone in the operating side, and wherein the operation console further comprises a sound microphone for sensing the in-coming dial tone from the picture telephone in the operating side and a voice and sound recognizing section for identifying the in-coming dial tone.

\* \* \* \* \*